(12) United States Patent
Takeo et al.

(10) Patent No.: US 7,175,972 B2
(45) Date of Patent: Feb. 13, 2007

(54) METHOD FOR FABRICATING A THIN FILM MAGNETIC HEAD

(75) Inventors: Kenji Takeo, Chuo-ku (JP); Hiroyuki Miyamoto, Chuo-ku (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/844,400

(22) Filed: May 13, 2004

(65) Prior Publication Data
US 2004/0234896 A1   Nov. 25, 2004

(30) Foreign Application Priority Data
May 21, 2003   (JP)   ............................. 2003-144128

(51) Int. Cl.
*G03F 7/26* (2006.01)
(52) U.S. Cl. ...................... 430/319; 430/311; 430/330
(58) Field of Classification Search ................ 430/313, 430/319, 322, 950
See application file for complete search history.

(56) References Cited

U.S. PATENT DOCUMENTS 5,691,111 A * 11/1997 Iwasa et al. ............. 430/270.1
6,465,149 B2   10/2002 Kamijima et al. ....... 430/270.1

FOREIGN PATENT DOCUMENTS

JP   A 9-180127   7/1997

* cited by examiner

Primary Examiner—Kathleen Duda
(74) Attorney, Agent, or Firm—Oliff & Berridge, PLC

(57) ABSTRACT

A plating underlayer is formed on an insulating film. An anti-reflection film is formed on the plating underlayer. A photoresist is formed over the antireflection film 62. The photoresist and the antireflection film are exposed and developed to form a resistframe made thereof. A second magnetic layer is formed within an inner pattern enclosed by the resistframe. The anti-reflection film is made of a material soluble for a developer through exposure.

11 Claims, 12 Drawing Sheets

METHOD FOR FABRICATING A THIN FILM MAGNETIC HEAD

BACKGROUND OF THE INVENTION

1. Field of the Invention

This invention relates to a method for fabricating a thin film magnetic head.

2. Related Art Statement

In the fabrication of a thin film magnetic head, normally, a second magnetic film serving as a top magnetic film is formed after a first magnetic film (bottom magnetic film), a gap film, an insulating film to support a coil film are formed on a wafer. Moreover, in the formation of the second magnetic film, a plate underfilm is formed over the surface of the wafer including the insulating film by a sputtering method, etc. Then, a photoresist is applied on the surface of the plate underfilm and is processed by a photolithography method to form a resistframe for the formation of the second magnetic film. Then, the second magnetic film is formed in the area enclosed by the resistframe by an electroplating, etc. With the formation of the second magnetic film utilizing the electroplating, another film is plated beyond the resistframe, but it is removed.

In the second magnetic film-forming process, however, there is a problem due to the resistframe because an exposing light in the photolithography process to form the resistframe is reflected at the surface of the plate underfilm and then, introduced beyond a photomask-defining area to expose the photoresist around the photomask-defining area, resulting in the degradation in pattern precision of the resistframe and thus, the second magnetic film.

The degradation in pattern precision of the resistframe becomes conspicuous at the pole portion, where the second magnetic film is opposed to the first magnetic film via the gap film. On the backward area from the pole portion is positioned the insulating film rising up with an inclination of a given angle from the surface of the gap film. The starting point of the rising up corresponds to a Throat Height zero point and the rising up angle corresponds to an Apex Angle.

The second magnetic film constitutes the pole portion parallel to the gap film and the first magnetic film up to the Throat Height zero point and then, rises up with an inclination of the Apex Angle toward the top surface of the insulating film from the Throat Height zero point.

Thus, in the fabrication of the resistframe for the formation of the second magnetic film by the photolithography process, the photoresist stuck on the inclined portion with the Apex Angle toward the top surface of the insulating film must be exposed.

In this case, the exposing light is reflected at the plate underfilm stuck on the inclined portion, and is partially introduced to the pole portion, which results in the exposed pattern of the pole portion different from that of the photomask, and thus, the pattern destruction in the portion of the resistframe corresponding to the pole portion.

The pattern destruction of the resistframe has large difficulty in developing recording density by narrowing recording track width up to not more than 1.0 µm.

In order to iron out the above-mentioned problem, it is proposed in Patent publication 1 that before the formation of the photoresist frame serving as a top magnetic film, an antireflection film is formed, and a photoresist is formed on the antireflection film, and the resistframe is formed from the photoresist through exposure and development.

The antireflection film, however, can not be dissolved in an alkaline developer to remove the resistframe, so it is required to be removed by means of ashing or the like after the formation of the resistframe using the alkaline developer. Then, after the removal of the antireflection film, the second magnetic film is formed by means of plating or the like. Therefore, in the formation of the second magnetic film using the antireflection film by means of the photoresist technique, a large number of processings are required.

Also, the antireflection film is formed over the inner pattern enclosed by the resistframe. The inner pattern includes a pole portion area corresponding to the pole portion of the top magnetic film and a second yoke area corresponding to the yoke portion. Therefore, the antireflection film must be removed in the pole portion area and the second yoke area.

In the resistframe, however, the pole portion area is quite different in opening area from the second yoke portion. In addition, for high density recording, the opening area of the pole portion area tends to be narrowed up to 1 µm or below. In the removal of the antireflection film stuck on the inner pattern enclosed by the resistframe, therefore, the second yoke area is quite different in etching rate from the pole portion area. Concretely, it takes long period of time in etching the pole portion area than the second yoke portion. As a result, at the removal of the antireflection film, the resistframe is etched largely at the pole portion area to enlarge the distance of the resistframe thereat. In other words, the distance of the resistframe is enlarged through the removal of the antireflection film. As a result, the antireflection film, which is formed inherently for narrowing the pole portion width, enlarges the resistframe distance, becoming an obstacle in the narrowing of the pole portion width.

An antireflection film soluble in a photoresist developer is proposed in Patent publication 2, which is suitable for ironing out the technical problem of Patent publication 1. Since the developing degree of the antireflection film depends on the frame width of an opening for a pole portion made by a photoframe which is formed on the antireflection film, if each frame width fluctuates on the same wafer, it may also fluctuate. For example, the antireflection film may be developed excessively at one opening so that it may be infiltrated under the photoresist, and the antireflection film may be developed insufficiently at another opening so that it remains partially in the inner bottom surface of the opening.

[Patent Publication 1]
  Japanese patent application Laid-open No. 9-180127

[Patent Publication 2]
  Japanese patent application Laid-open No. 2000-314963

SUMMARY OF THE INVENTION

It is an object of the present invention to provide a method for fabricating a thin film magnetic head with a precisely narrowed pole portion.

For ironing out the above-mentioned problem, this invention relates to a method for fabricating a thin film magnetic head having a recording element with a first magnetic layer, an insulating film, a coil film and a second magnetic layer. The first magnetic layer and the second magnetic layer constitute a thin film magnetic circuit, and the insulating film is disposed between the first magnetic layer and the second magnetic layer and supports the coil film. The second magnetic layer is disposed on the insulating film.

In the fabricating method of the present invention, first of all, a plating underlayer is formed after the first magnetic layer, the coil film and the insulating layer are formed and before the second magnetic layer is formed. Then, an antireflection film is formed on the plating underlayer, and a photoresist is applied over the antireflection film.

Then, the photoresist and the antireflection film are exposed and developed to form a resistframe made thereof. Then, the second magnetic layer is formed within an inner pattern enclosed by the resistframe.

The antireflection film is made of a material soluble for a developer through exposure.

As mentioned above, in the present invention, the insulating film, the plating underfilm and the antireflection film are successively formed, and then, the photoresist is applied over the antireflection film. Then, the photoresist and the antireflection film are exposed and developed to form the resistframe made thereof. In the fabrication of the resistframe for the second magnetic film through photolithography, therefore, the exposing light can not be reflected largely at the convex-concave portions and the inclined portions of the insulating film. Therefore, the exposed pattern of the photoresist can be almost defined by the exposed pattern of the photomask, so that the resist frame can be patterned precisely. As a result, the second magnetic film, particularly, the pole portion thereof, can be patterned precisely. Since the resistframe can be patterned even at the area corresponding to the pole portion, the track width of the intended thin film magnetic head can be narrowed. Particularly, when the insulating film includes the rising up inclined portion in the side of the air bearing surface and the pole portion of the second magnetic film is formed on the inclined portion of the insulating film, the present invention is extremely suitable as a pole portion-precise patterning technique.

The present invention is characterized in that the antireflection film is made of the photosensitivity material soluble for a developer through exposure. As the photosensitivity material is exemplified "D-BARC" made by Clariant Corp. In the exposure for the photoresist and the antireflection film, therefore, the antireflection film is soluble in the developer with tantamount to the photoresist. As a result, the inner walls of the resistframe can be formed almost vertically through exposure and development. For example, even though the inner frame width of the resistframe is narrowed to 300 nm or below, the inner walls of the resistframe can be formed almost vertically.

In the present invention, the second magnetic film is formed within the resistframe formed as mentioned above, the resultant pole portion can be narrowed precisely.

The antireflection film and the photoresist may be removed after the formation of the second magnetic film. The antireflection film can be removed by means of developing, ashing or RF ashing.

The antireflection film can be exposed after the formation of the antireflection film and before the application of the photoresist. In this case, the solubility of the antireflection film for the developer can be enhanced.

In a preferred embodiment of the present invention, the antireflection film can be heated within 80–150° C. before the application of the photoresist. In addition, the antireflection film can be heated within 80–150° C. after the exposure and before the development.

In the exposure, a laser beam with a wavelength of 160–400 nm may be employed. The photoresist may be made of chemical sensitive photoresist. The fabricating method of the present invention can include the step of forming a magnetoresistive effective element.

The other objects, configurations and advantages will be explained in detail, with reference to the attaching drawings in embodiments.

BRIEF DESCRIPTION OF THE DRAWINGS

For a better understanding of this invention, reference is made to the attached drawings, wherein.

DETAILED DESCRIPTION OF PREFERRED EMBODIMENTS

This invention will be explained in detail, with reference to the attaching drawings, hereinafter.

Figure 1:
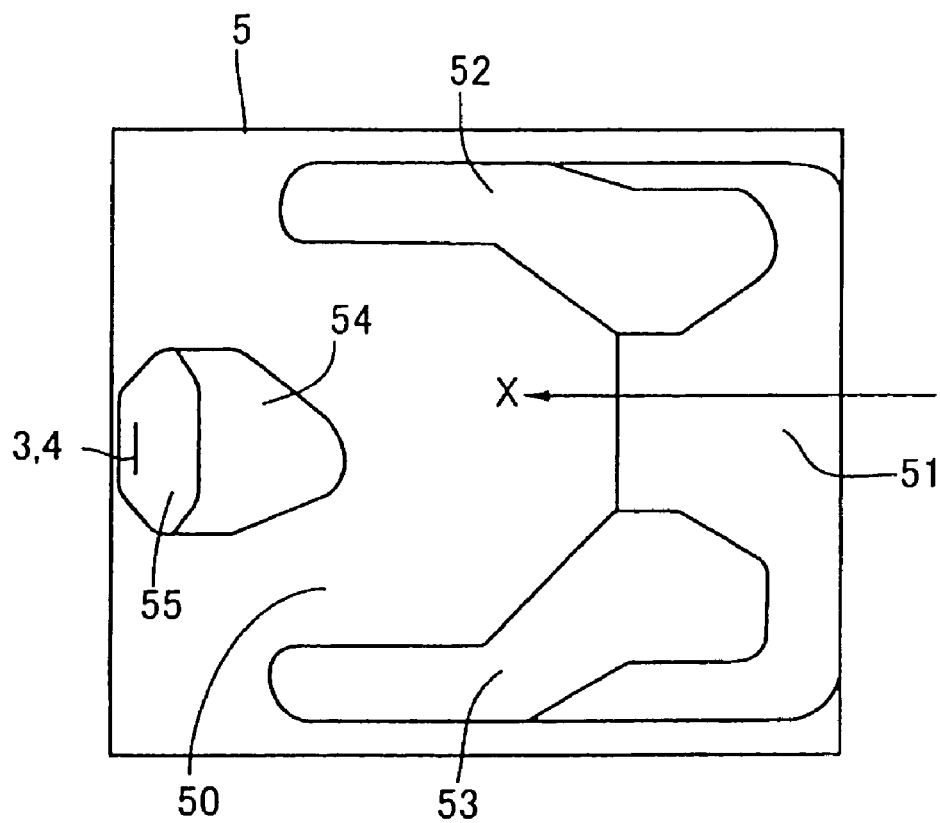
FIG. 1 is a plan view illustrating a thin film magnetic head to be fabricated according to the present invention.
Figure 2:
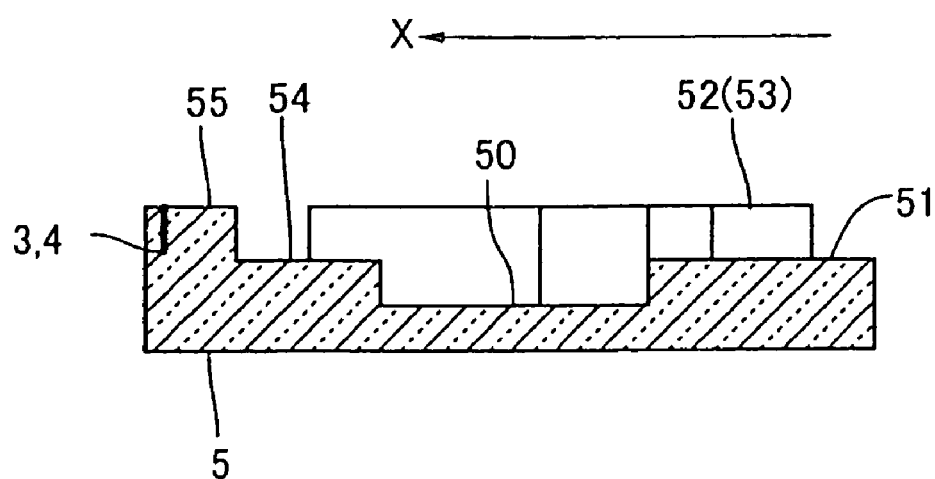
FIG. 2 is a cross sectional view of the thin film magnetic head illustrated in FIG. 1.
Figure 3:
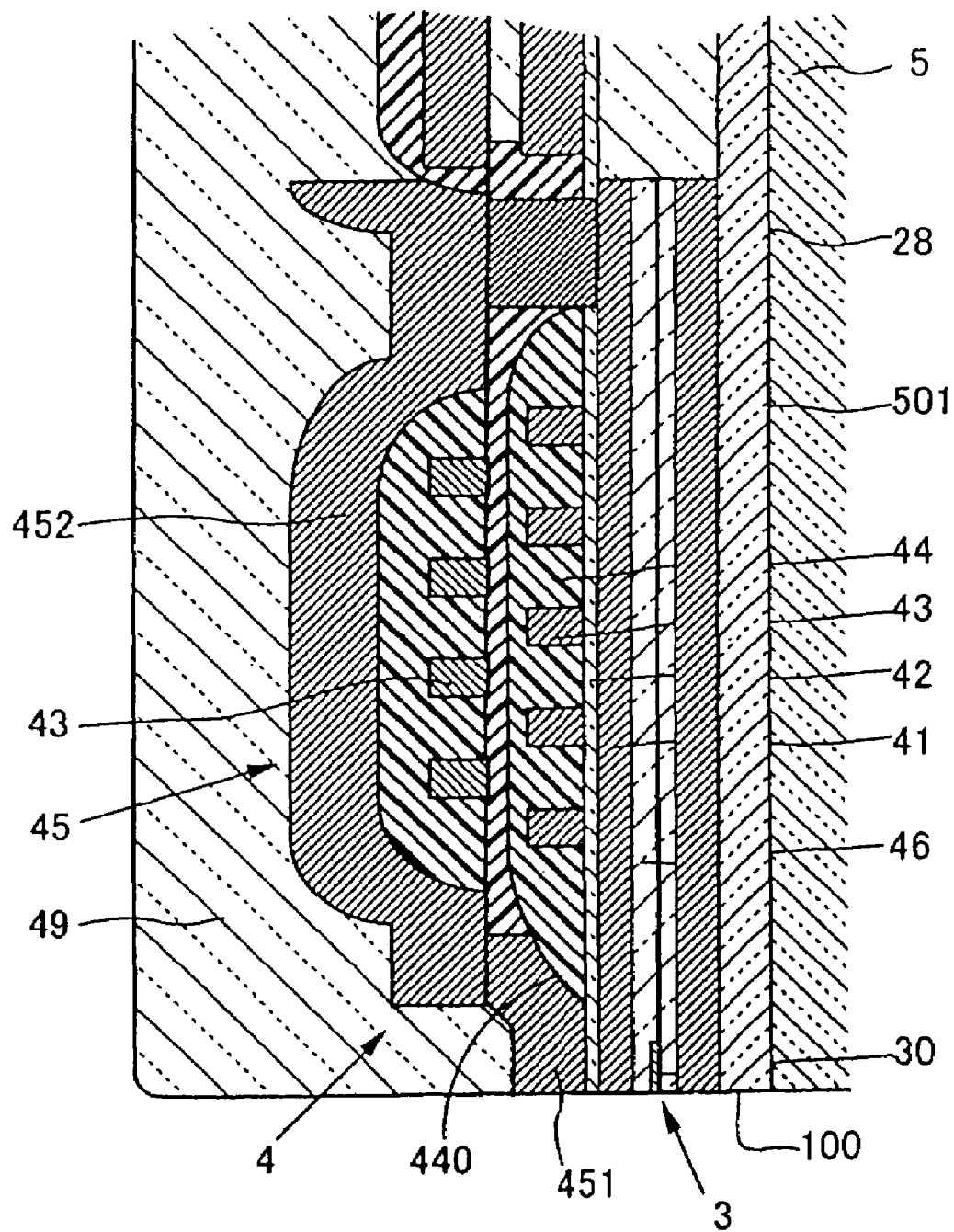
FIG. 3 is a cross sectional view in enlargement illustrating the portion containing the magnetic conversion element of the thin film magnetic head illustrated in FIGS. 1 and 2.

FIG. 1 is a plan view illustrating a thin film magnetic head to be fabricated according to the present invention, as viewed from the medium-opposing surface thereof, and FIG. 2 is a cross sectional view of the thin film magnetic head illustrated in FIG. 1, and FIG. 3 is a cross sectional view in enlargement illustrating the portion containing the magnetic conversion element of the thin film magnetic head illustrated in FIGS. 1 and 2. The illustrated thin film magnetic head includes a slider base 5 and electromagnetic conversion elements 3, 4.

The slider base 5 is made of a ceramic material such as AlTiC($Al_2O_3$TiC), and has various geometrical shapes for the improvement of floating performance on the medium-opposing surface. As the typical geometrical shape, in this embodiment, the slider base 5 has a first step 51, a second step 52, a third step 53, a fourth step 54 and a fifth step 55 on the base surface 50. The base surface 50 functions as a negative pressure generating region for the air flow designated by the arrow "X". The second step 52 and the third step 53 function as stepwise air bearings rising from the first step 51. The surfaces of the second step 52 and the third step 53 constitute an air bearing surface (hereinafter, called as an "ABS") 100.

The fourth step 54 is risen stepwisely from the base surface 50, and the fifth step 55 is risen stepwisely from the fourth step 54. The electromagnetic conversion elements 3 and 4 are disposed on the fifth step 55.

Referring to FIG. 3, on the edge of the slider base 5 is formed an insulating film 501 of insulating material such as aluminum oxide ($Al_2O_3$) or $SiO_2$.

The electromagnetic conversion elements 3 and 4 includes an MR element 3 as a reproducing element and a recording element 4, respectively. The MR element 3 includes an SV film or a TMR film. With the SV film, the MR element 3 is constructed as a CIP type MR element or a CPP type MR element. With the TMR film, the MR element 3 is so constructed that a sense current is inherently flowed perpendicularly through the MR element 3.

The recording element 4 may be made of an inductive type magnetic conversion element of which the first writing pole portion is exposed to the ABS 100. The recording element 4 is disposed in the vicinity of the MR element 3 as the reproducing element and covered with a protective film 49. The MR element 3 includes an MR film 30, a first shielding layer 28, a gap layer 46 and a second shielding layer 41 functioning as a first magnetic layer.

The recording element 4 includes a first magnetic layer 41 functioning as the second shielding layer 41, a second magnetic layer 45, a recording gap layer 42, and a thin film coil 43. The first magnetic layer 41 is magnetically connected to the second magnetic layer 45. The recording gap layer 42 is disposed between the magnetic pole portion of the bottom magnetic layer 41 and the second magnetic pole portion 451 of the second magnetic layer 45. The thin film coil 43 is embedded in an insulating film 44 formed in the inner gap between the first magnetic layer 41 and the second yoke portion 452 of the second magnetic layer 45. The insulating film 44 is formed in arc shape so that the periphery of the insulating film 44 is partially inclined.

With the second magnetic layer 45, the top pole portion 451 is opposed to the first pole portion of the first magnetic layer 41 via the recording gap layer 42. The top yoke portion 452 is joined with the top surface of the top pole portion 451, formed directly on the insulating film 44 and joined with the first magnetic layer 41 as viewed from the top pole portion 451, thereby to complete a thin film magnetic circuit.

The second pole portion 451 is risen along the inclined portion 440 constituting the periphery of the insulating film 44 in the inner gap, and the Throat Height is defined by the rising start point of the insulating film 44 on the recording gap layer 42, and the Apex angle is defined by the rising angle of the insulating film 44. The present invention is directed at narrowing the second pole portion 451 precisely.

Then, the fabricating method of the thin film magnetic head illustrated in FIGS. 1–3 will be described, with reference to FIGS. 4–19. The fabricating method will be carried out on a wafer. Also, it is supposed that the fabricating process for the MR element has been already done.

Figure 4:
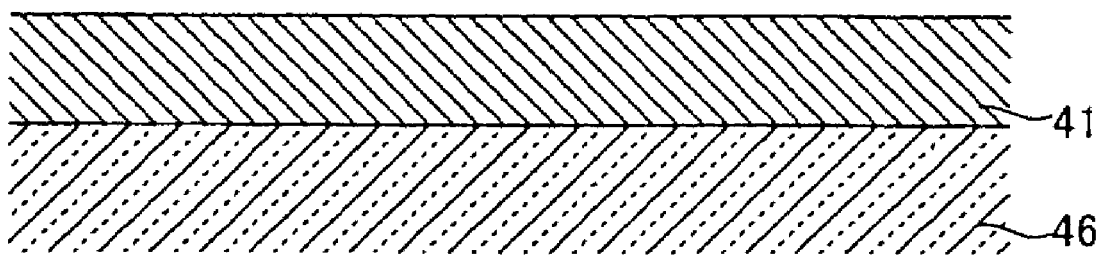
FIG. 4 is a cross sectional view illustrating one step contained in the fabricating method of the present invention.

First of all, as illustrated in FIG. 4, the first magnetic layer 41 is formed on a gap layer 46 by means of sputtering, photolithography and plating. The material, thickness and fabricating process of the first magnetic layer 41 can be determined on normal technique.

Figure 5:
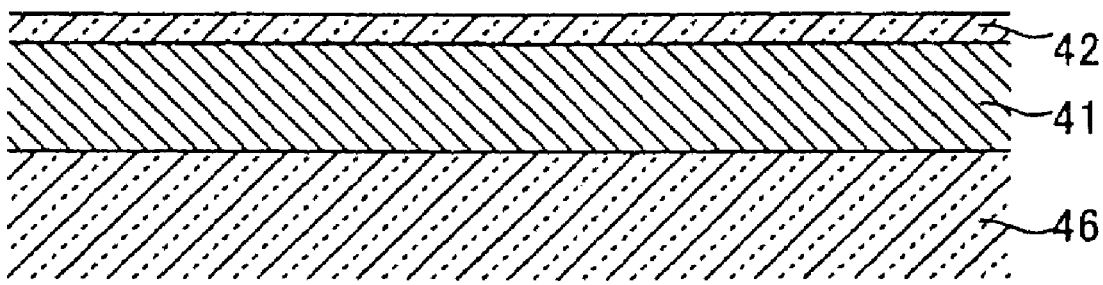
FIG. 5 is a cross sectional view illustrating the step after the step in FIG. 4.

Then, as illustrated in FIG. 5, the recording gap layer 42 is formed of non-magnetic material such as $Al_2O_3$ or $SiO_2$ on the first magnetic layer 41. The material, thickness and fabricating process of the recording gap layer 42 can be determined on normal technique.

Figure 6:
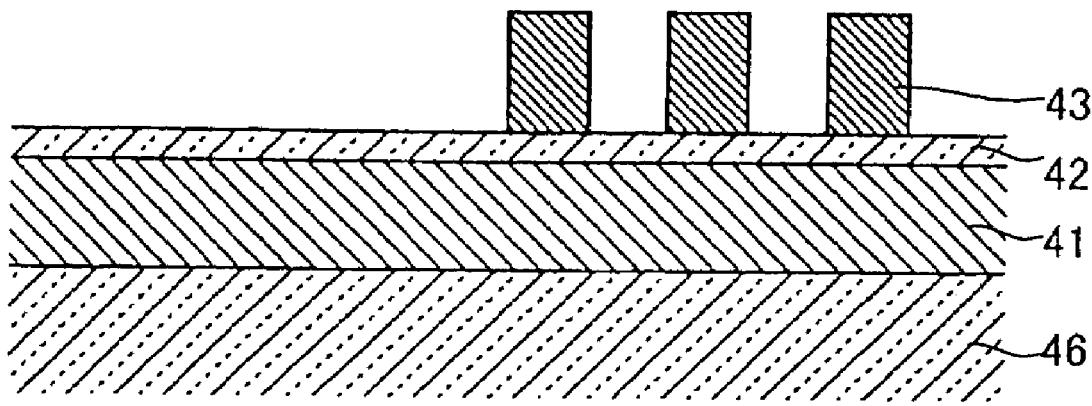
FIG. 6 is a cross sectional view illustrating the step after the step in FIG. 5.
Figure 7:
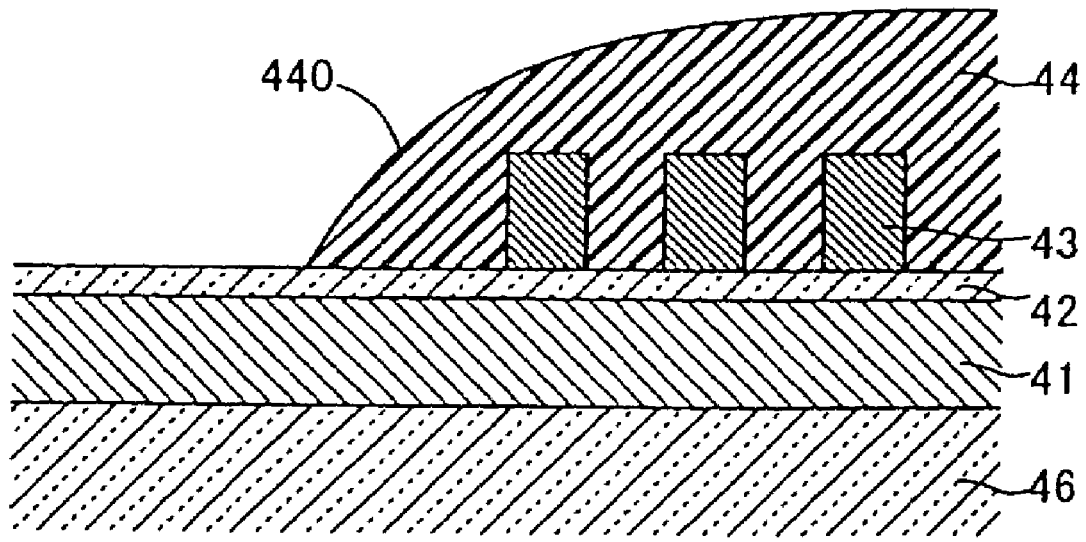
FIG. 7 is a cross sectional view illustrating the step after the step in FIG. 6.

Then, as illustrated in FIG. 6, the coil film 43 is formed on the recording gap layer 42 by means of sputtering, photolithography and plating, and the insulating film 44 is formed in arc shape on the recording gap layer 42 by means of spin coating and photolithography so that the periphery of the insulating film 44 is partially risen to form the inclined portion 440.

Figure 8:
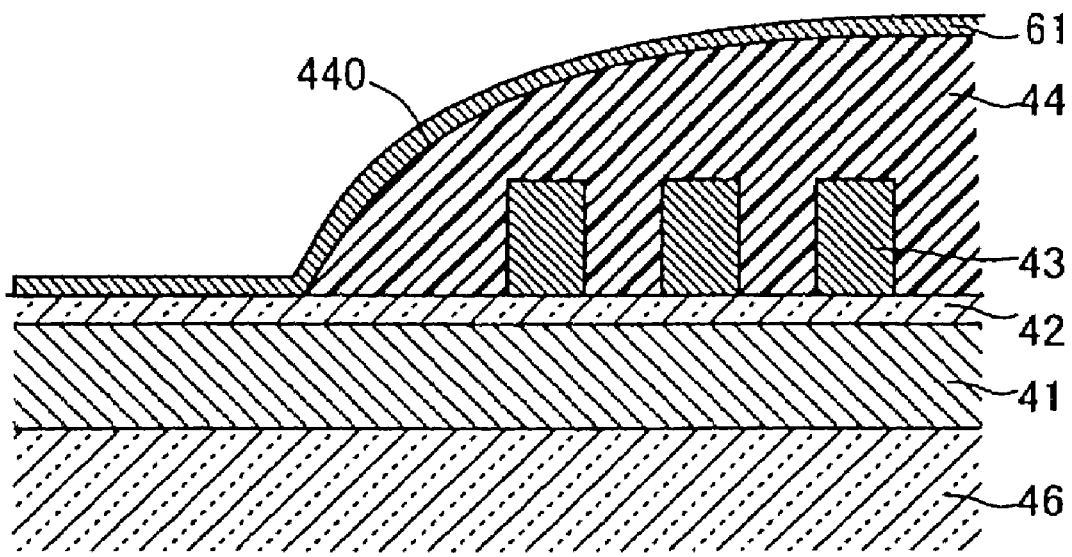
FIG. 8 is a cross sectional view illustrating the step after the step in FIG. 7.

Then, as illustrated in FIG. 8, a plating underlayer 61 is formed over the recording gap layer 42 and the insulating film 44 by means of sputtering so as to be deposited over the inclined portion 440 of the insulating film 44.

Figure 9:
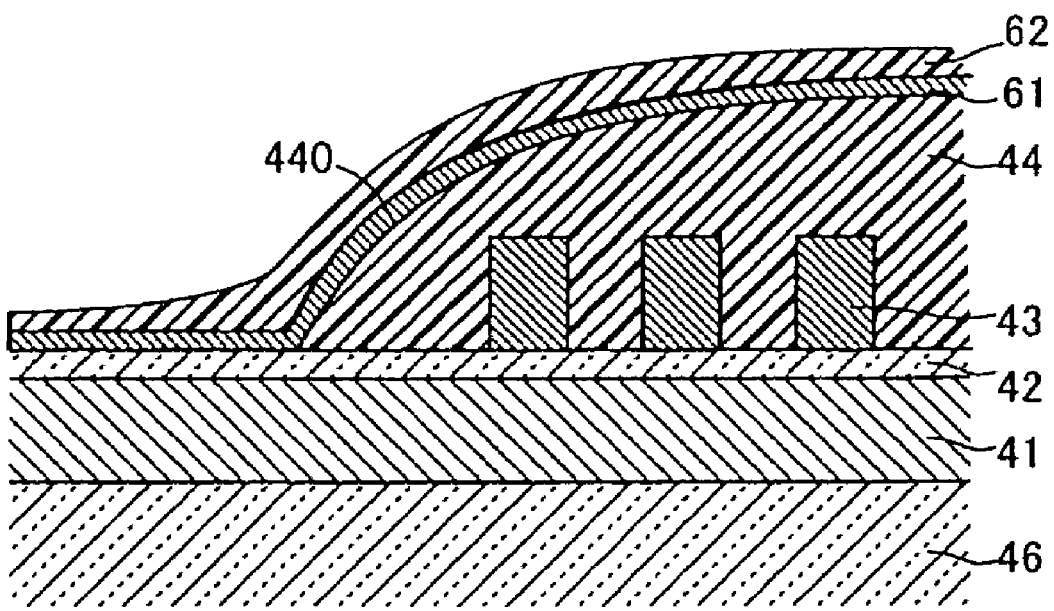
FIG. 9 is a cross sectional view illustrating the step after the step in FIG. 8.

Then, as illustrated in FIG. 9, an antireflection film 62 is formed on the plating underlayer 61 by means of spin coating so as to cover at least the portion of the plating underfilm 61 formed over the inclined portion 440 of the insulating film 44. It is required that the antireflection film 62 is made of a photosensitivity material soluble for a developer through exposure. Therefore, the sort of the photosensitivity material depends on the sort of the developer.

As the developer is exemplified TMAH (tetramethylammonium-hydroxide) based alkaline developer, particularly, 2.38% TMAH alkaline developer. In this case, as the photosensitivity material for the antireflection film 62 is exemplified "D-BARC" made by Clarian Corp. In the use of the D-BARC as the photosensitivity material, as the developer are also exemplified phosphoric acid ($Na_nH_3\text{-}nPO_4$), sodium hydrate (NaOH) and organic amine, in addition to the TMAH alkaline developer.

The antireflection film 62 is heated within 80–150° C. before the application of photoresist. In this case, the antireflection film 62 can be rendered soluble for the alkaline developer sufficiently without the intermixing between the antireflection film 62 and the photoresist.

Figure 10:
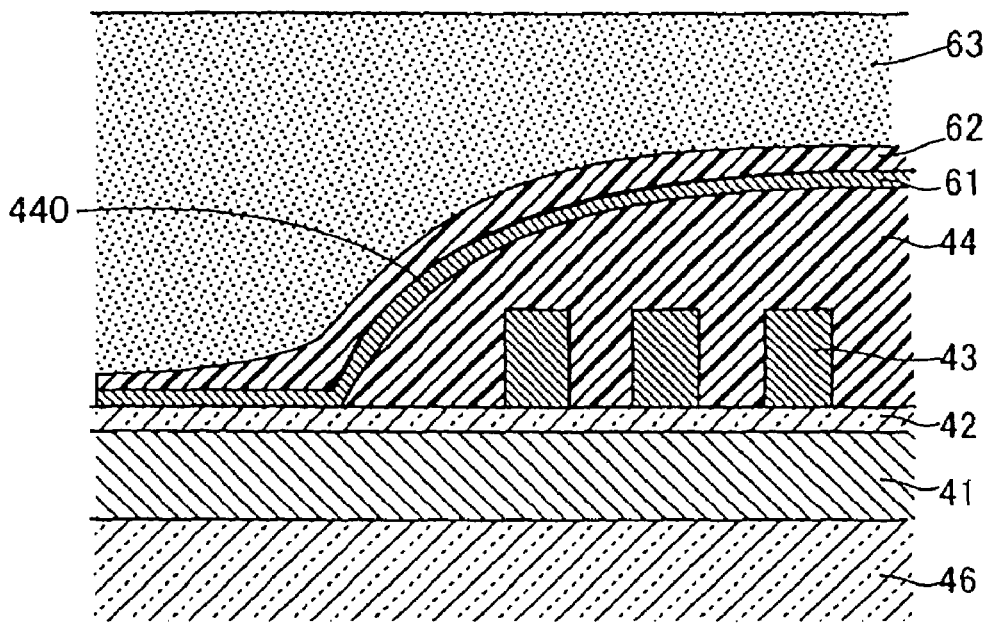
FIG. 10 is a cross sectional view illustrating the step after the step in FIG. 9.

Then, as illustrated in FIG. 10, the photoresist 63 is applied on the antireflection film 62 by means of spin coating. The photoresist 63 is preferably made of chemical sensitive photoresist.

Figure 11:
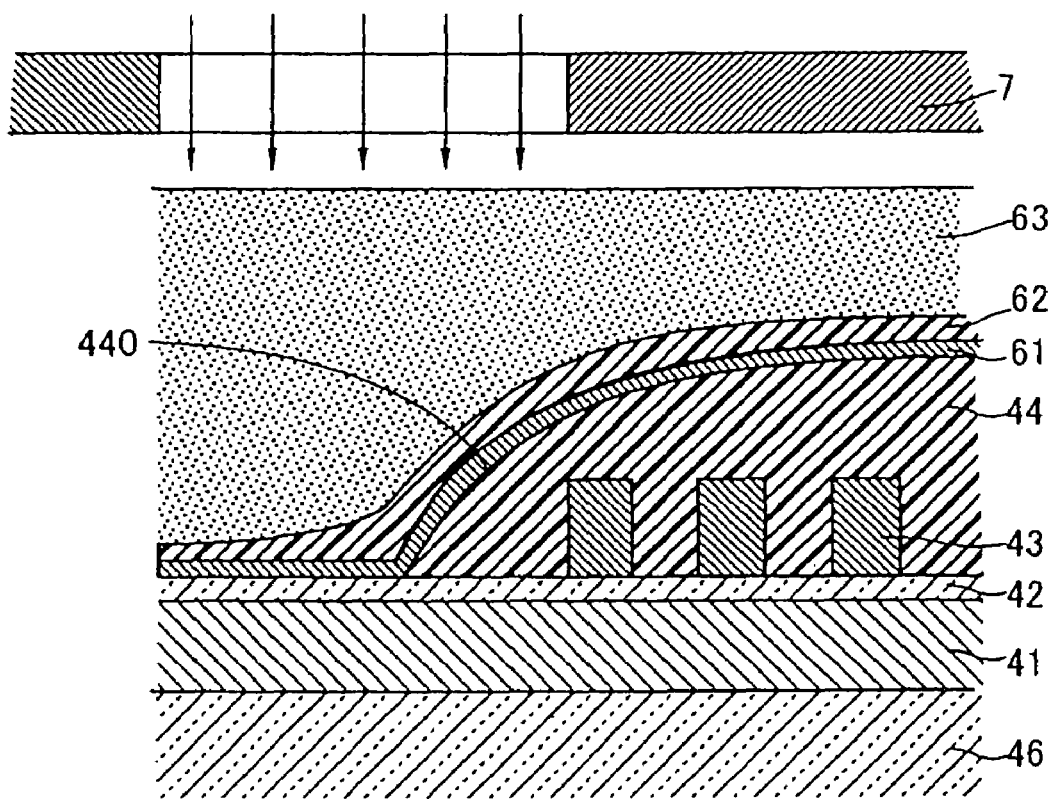
FIG. 11 is a cross sectional view illustrating the step after the step in FIG. 10.
Figure 12:
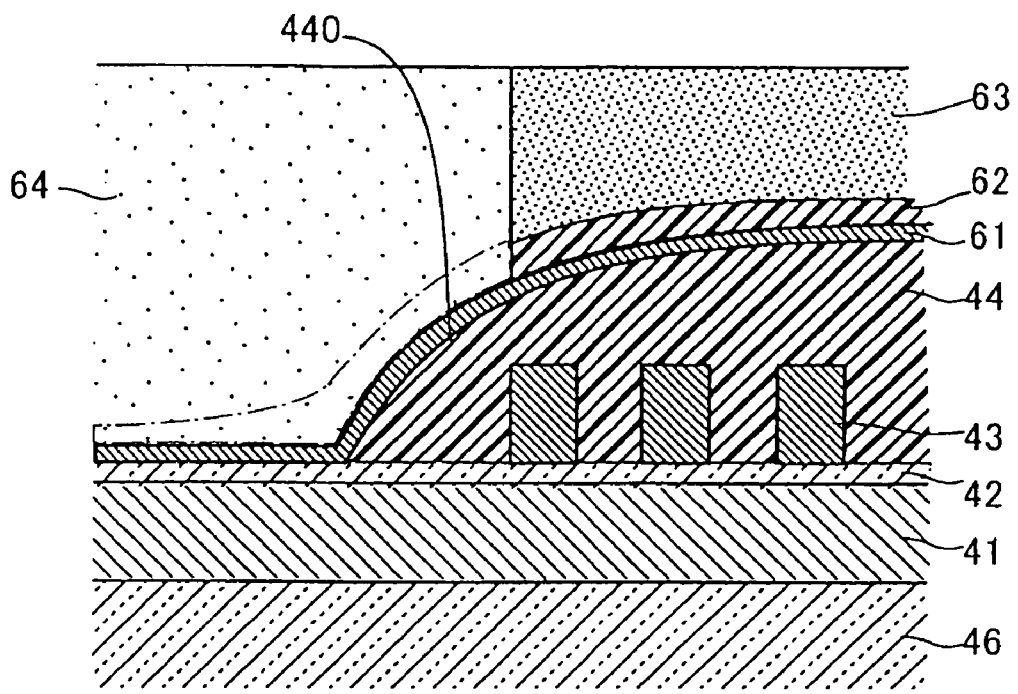
FIG. 12 is a cross sectional view illustrating the step after the step in FIG. 11.
Figure 13:
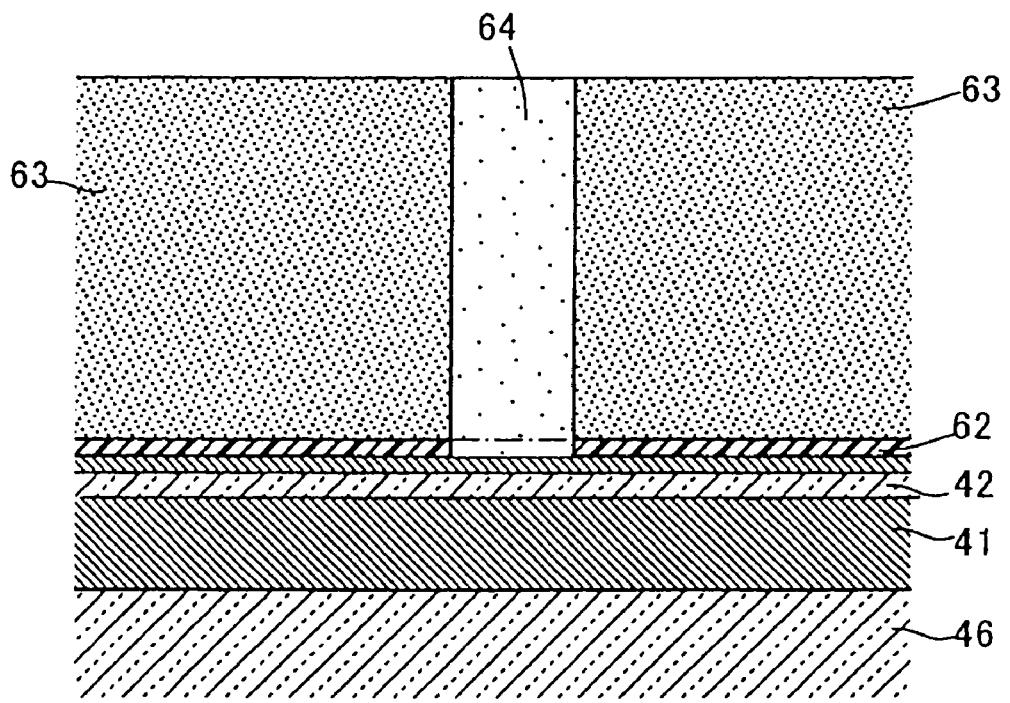
FIG. 13 is a cross sectional view illustrating the same step as FIG. 12, as viewed from the left-hand side thereof.

Photolithography technique is carried out for the photoresist 63 and the antireflection film 62. In the photolithography technique, first of all, as illustrated in FIG. 11, exposure is carried out. In this case, the photoresist 63 and the antireflection film 62 are exposed and patterned via a photomask 7. Since the antireflection film 62 is made of photosensitivity material, as illustrated in FIGS. 12 and 13, the antireflection film 62 is exposed and patterned with the photoresist 63 commensurate with the mask pattern of the photomask 7.

In this case, since the antireflection film 62 is formed on the inclined portion 440 of the insulating film 44, in the exposure, the exposing light can not be reflected largely at the plating underlayer 61. Therefore, the resultant exposed pattern 64 is precisely defined commensurate with the pattern precision of the photomask 7.

In view of the formation of minute exposed pattern, in the exposure, a laser beam with a wavelength of 160–400 nm can be preferably employed. The antireflection film 63 can be heated within 80–150° C. after the exposure and before the development.

Figure 14:
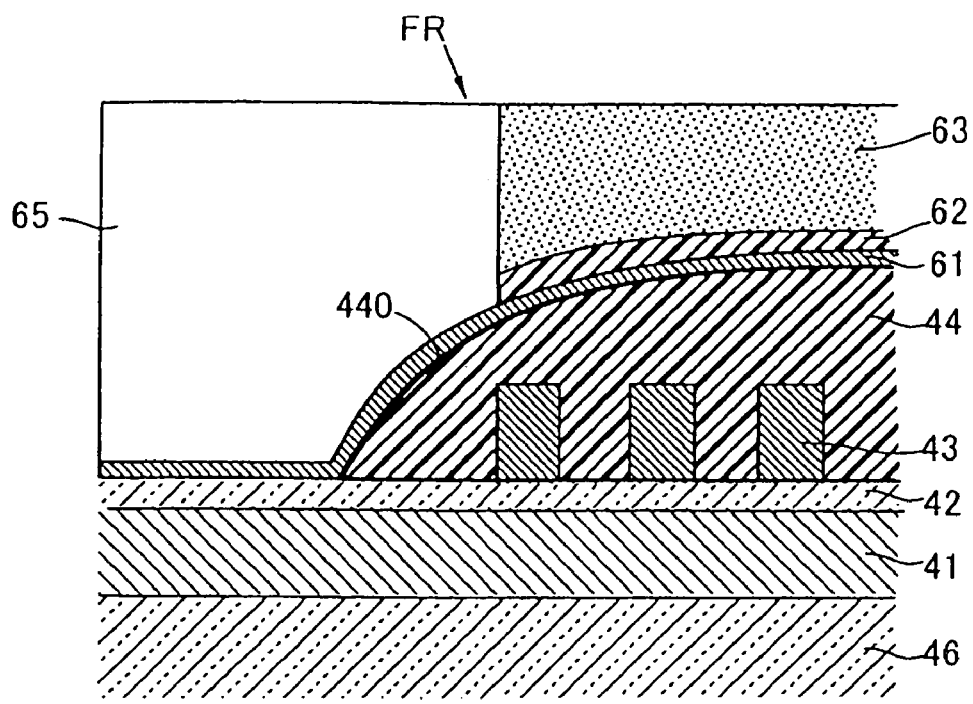
FIG. 14 is a cross sectional view illustrating the step after the step in FIGS. 12 and 13.
Figure 15:
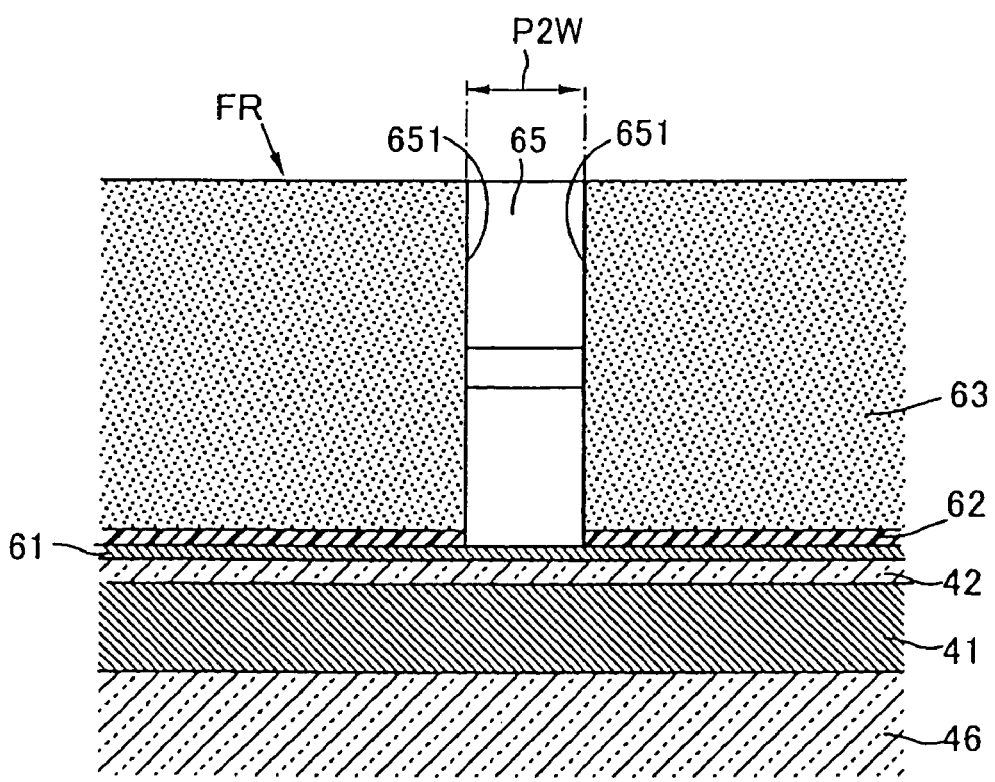
FIG. 15 is a cross sectional view illustrating the same step as FIG. 14, as viewed from the left-hand side thereof.

As illustrated in FIGS. 14 and 15, a resistframe FR with a predetermined inner pattern 65 is made of the remaining photoresist 63 and the antireflection film 62 not exposed through development. Since the antireflection film 62 is soluble for the developer, in the development, the exposed area 64 of the antireflection film 62 is removed with the exposed area 64 of the photoresist 62.

Since the antireflection film 62 is made of photosensitivity material soluble for the development through exposure, in the exposure, the antireflection film 62 becomes soluble for the developer as the photoresist 63. Therefore, the inner walls 651 of the resistframe FR can be formed almost vertically through exposure and development. For example, even though the inner frame width P2W (refer to FIG. 5) of the inner pattern 65 enclosed by the resistframe FR is narrowed to 300 nm or below, the inner walls 651 can be formed almost vertically.

As mentioned previously, in the use of the D-BARC made by Clariant Corp. as the photosensitivity material for the antireflection film 62, as the developer can be employed TMAH alkaline developer, phosphoric acid ($Na_nH_3-nPO_4$), sodium hydrate (NaOH) and organic amine.

Figure 16:
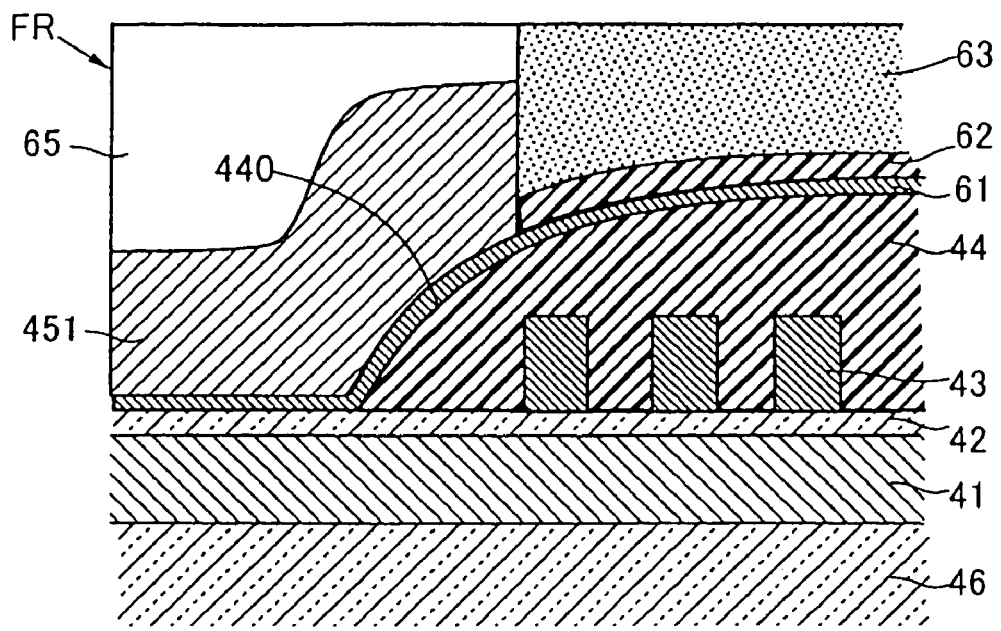
FIG. 16 is a cross sectional view illustrating the step after the step in FIGS. 14 and 15.
Figure 17:
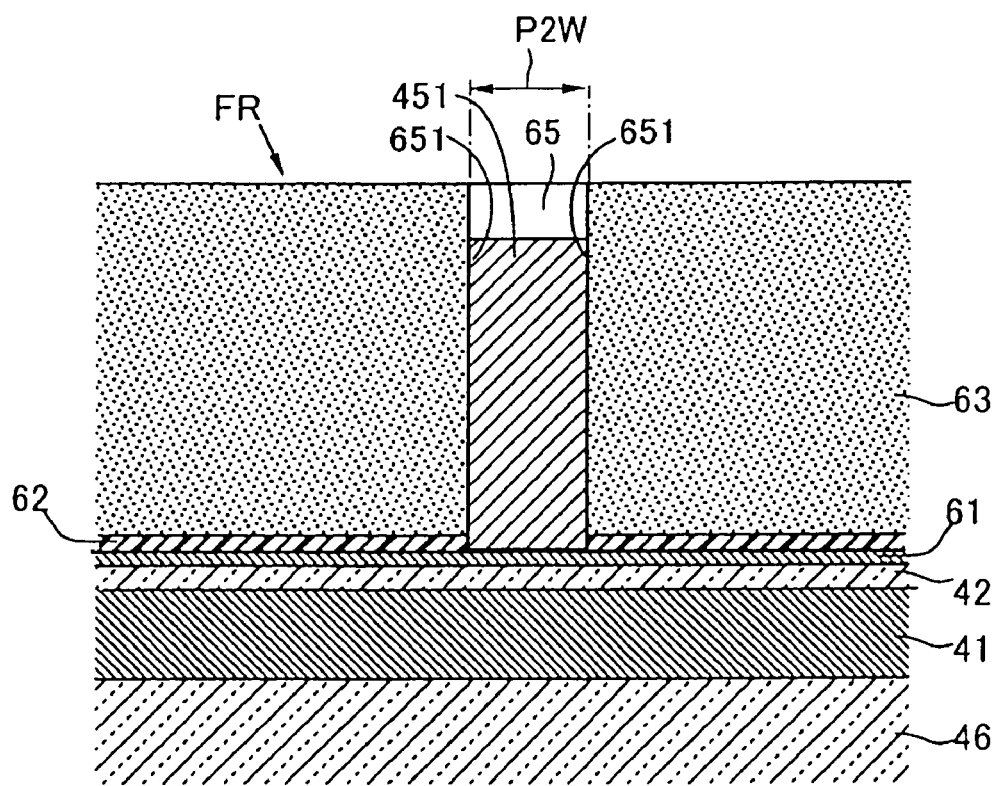
FIG. 17 is a cross sectional view illustrating the same step as FIG. 16, as viewed from the left-hand side thereof.

Then, as illustrated in FIGS. 16 and 17, the second pole portion 451 is formed by means of pattern plating. In the present invention, as described in this embodiment, the second pole portion 451 can be narrowed precisely through the formation within the inner pattern 65 enclosed by the resistframe FR.

Figure 18:
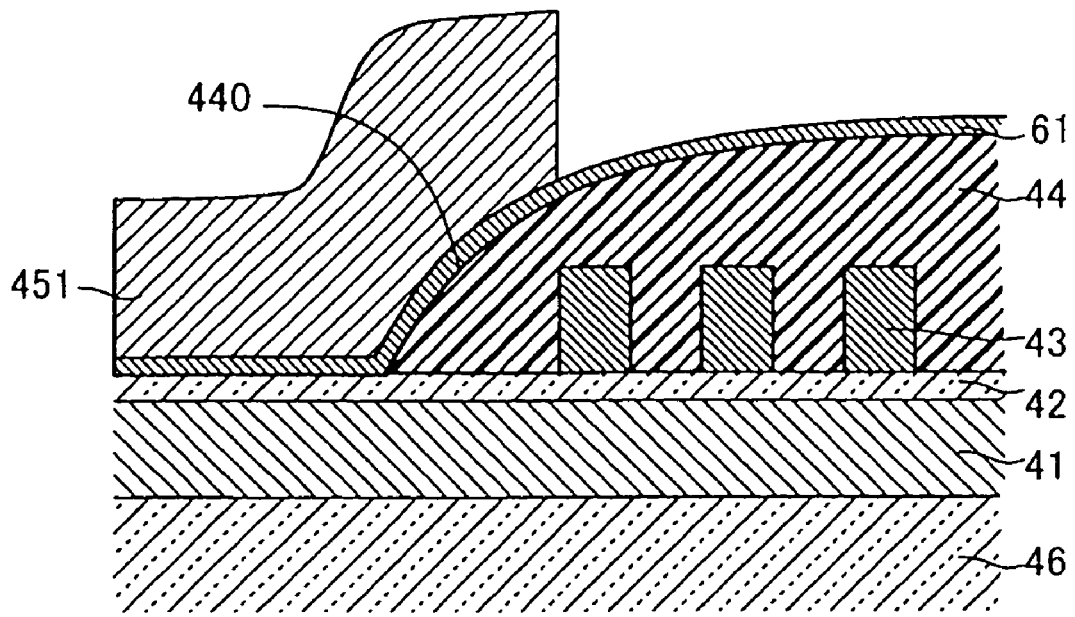
FIG. 18 is a cross sectional view illustrating the step after the step in FIGS. 16 and 17.
Figure 19:
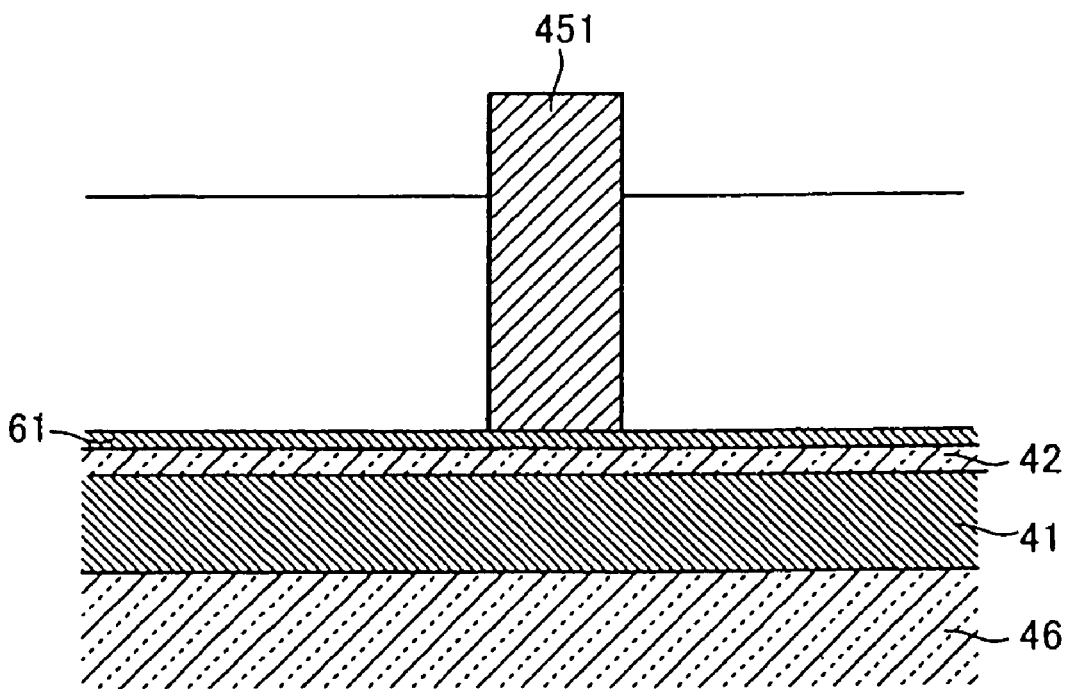
FIG. 19 is a cross sectional view illustrating the same step as FIG. 18, as viewed from the left-hand side thereof, FIG. 20 are graphs illustrating measurement data relating to the top pole width P2W which are measured on a wafer.

After the pattern plating, as illustrated in FIGS. 18 and 19, the photoresist 63 and the antireflection film 62 are removed. The antireflection film 62 may be removed by means of developing, ashing or RF ashing.

Then, plating debris around the second pole portion 451, originated from the plating underlayer 61, is removed by means of dry etching. Therefore, the second pole portion 451 can be patterned precisely.

Figure 20:
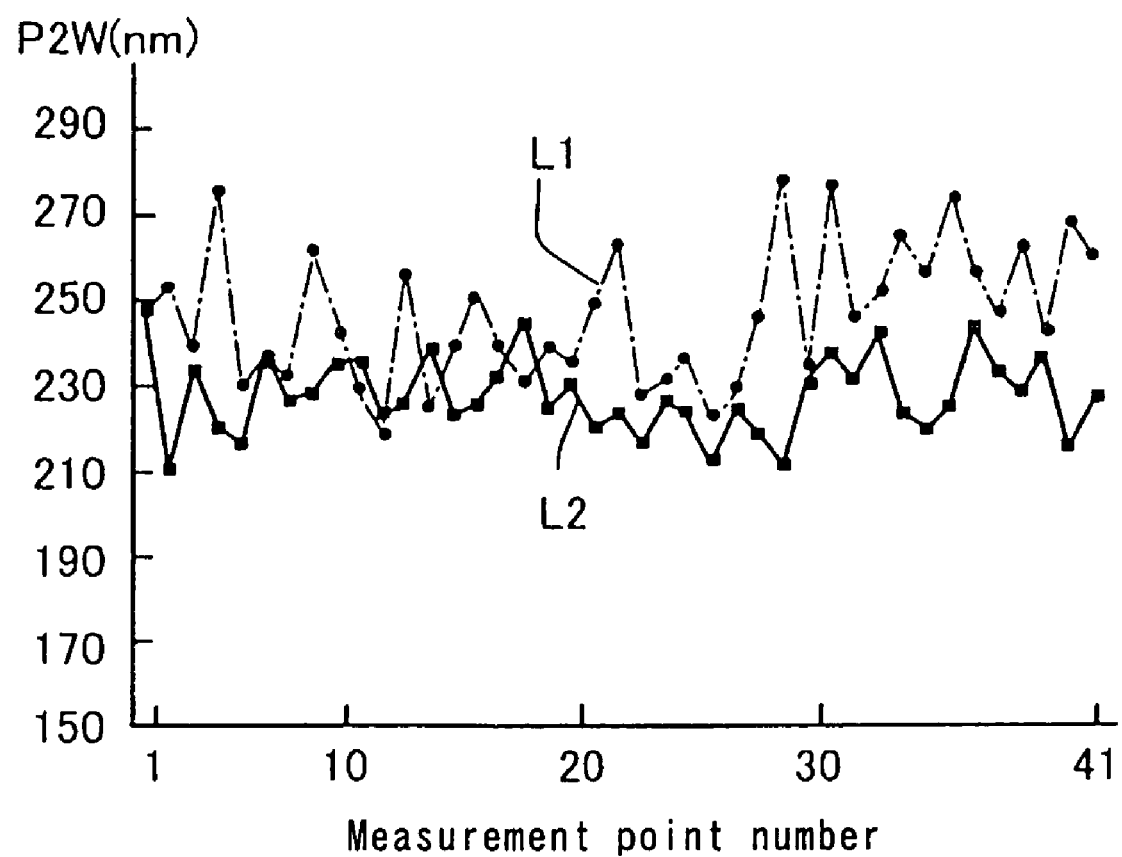

FIG. 20 are graphs illustrating measurement data relating to the top pole width P2W which are measured on a wafer. The graph L1 relates to a thin film magnetic head according to a conventional fabricating method, and the graph L2 relates to the thin film magnetic head according to the fabricating method of the present invention. In the conventional fabricating method, the antireflection film is made of a material soluble for a developer without photosensitivity. The abscissa axis designates 41 measurement points, and the ordinate axis designates top pole portion widths P2W (nm). The top pole portion widths P2W are measured by means of SEM. The 41 measurement points are dispersed on the wafer so as to check the fluctuation in the wafer of the top pole portion widths P2W.

As is apparent from FIG. 20, in comparison with the graphs L1 and L2, the top pole portion widths P2W relating to the thin film magnetic head according to the fabricating method of the present invention are smaller than the ones relating to the thin film magnetic head according to the conventional fabricating method. If the distribution of the top pole portion widths P2W in the wafer is defined by (3σ/mean), the distribution (3σ/mean) relating to the conventional fabricating method is 19.7%, and the distribution (3σ/mean) relating to the fabricating method of the present invention is 12.2%. Therefore, the distribution (3σ/mean) relating to the fabricating method of the present invention is improved by 7.5% in comparison with the distribution (3σ/mean) relating to the conventional fabricating method.

Figure 21:
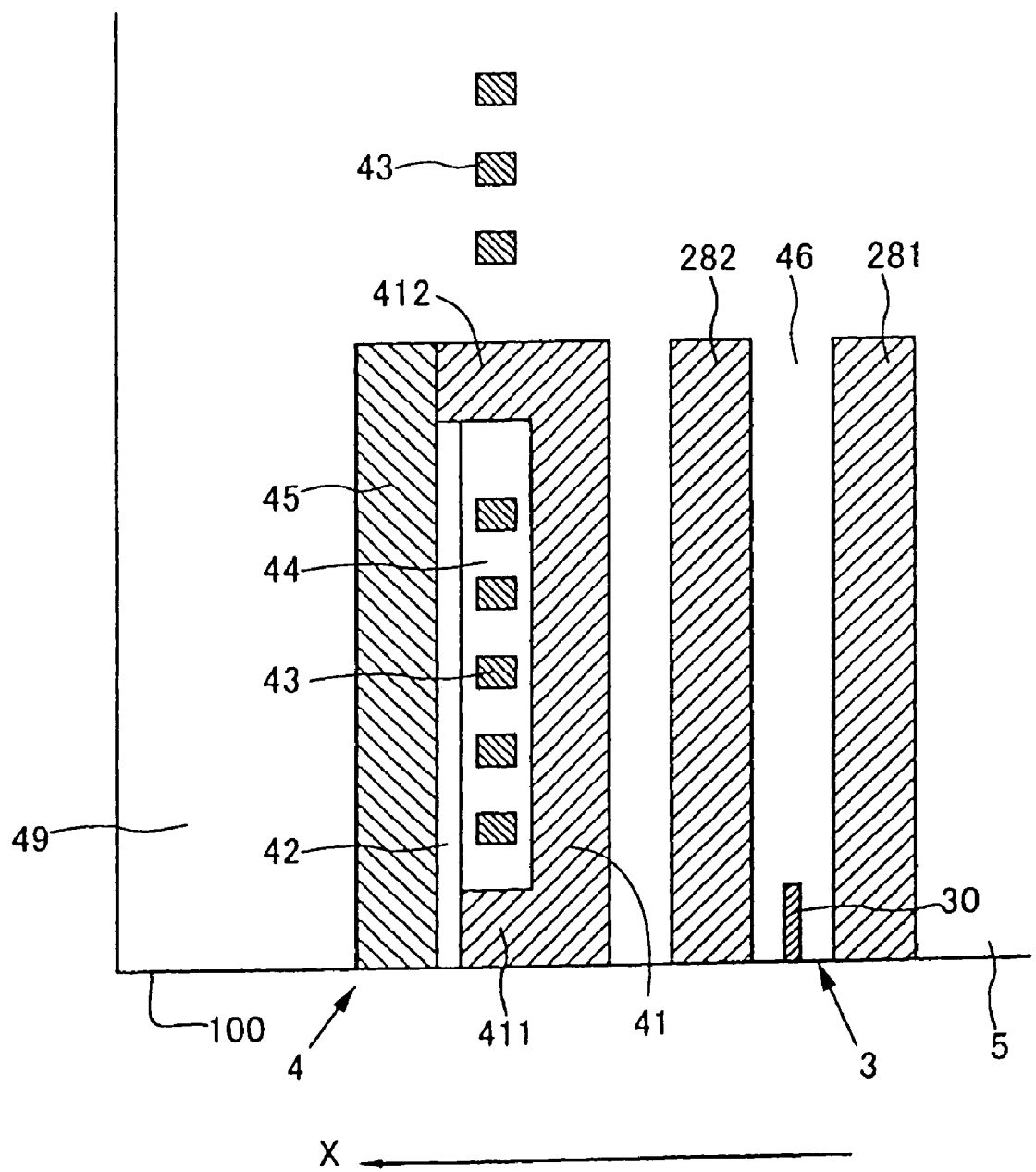
FIG. 21 is a cross sectional view illustrating another thin film magnetic head to be fabricated according to the present invention.

FIG. 21 is a cross sectional view illustrating another thin film magnetic head to be fabricated according to the present invention. The illustrated thin film magnetic head is called as a planer thin film magnetic head. The recording element 4 includes a first magnetic layer 41, a thin film coil 43, an insulating film 44, a recording gap film 42 and a second magnetic layer 45. The second magnetic layer 45 is formed in plane on the insulating film 44 and the recording gap layer 42 formed in the insulating film 44. With the first magnetic layer 41, the pole portion 411 in the ABS 100 is opposed to the second magnetic layer 45 via the recording gap layer 42. The first magnetic layer 41 is also joined with the second magnetic layer 45 at a backward joining portion 412 far from the ABS 100. The MR element 3 as a reproducing element is disposed below the recording element 4, and the MR film 30 is disposed in an insulating film 46 to separate a first shielding layer 281 and a second shielding layer 282.

With the application of the fabricating method of the present invention to the thin film magnetic head illustrated in FIG. 21, a plating underlayer is formed on the insulating film 44 and the recording gap layer 42, and an antireflection film is formed on the plating underlayer. Then, a photoresist is applied over the antireflection film. Then, the photoresist and the antireflection film are exposed and developed to form a resistframe made thereof. Then, the second magnetic layer 45 is formed within the pattern enclosed by the resistframe. In this embodiment, although the insulating film 44 is not inclined, some convex-concave portions are formed on the insulating film 44 and the recording gap layer 42. In this embodiment, therefore, the second magnetic layer 45 can be narrowed precisely without the patterning fluctuation due to the convex-concave portions.

Although the present invention was described in detail with reference to the above examples, this invention is not limited to the above disclosure and every kind of variation and modification may be made without departing from the scope of the present invention.

As mentioned above, according to the present invention can be provided a method for fabricating a thin film magnetic head with a precisely narrowed pole portion.

What is claimed is:

1. A method for fabricating a thin film magnetic head having a recording element with a first magnetic layer, an insulating film, a coil film and a second magnetic layer, wherein said first magnetic layer and said second magnetic layer constitute a thin film magnetic circuit, and said insulating film is disposed between said first magnetic layer and said second magnetic layer and supports said coil film, and said second magnetic layer is disposed on said insulating film, comprising the steps of:

forming a plating underlayer after forming said first magnetic layer, said coil film and said insulating layer and before forming said second magnetic layer, forming an antireflection film on said plating underlayer, heating said antireflection film within 80–150° C. after forming said antireflection film and before applying a photoresist, applying said photoresist over said antireflection film, exposing said photoresist and said antireflection film, heating said antireflection film within 80–150° C. after exposing and before developing said photoresist and said antireflection film, developing said photoresist and said antireflection film to form a resist frame made thereof; and forming said second magnetic layer within an inner pattern enclosed by said resist frame, wherein said antireflection film is made of a material soluble for a developer through exposure.

2. The fabricating method as defined in claim 1, wherein said insulating film includes an inclined portion in an air bearing surface of said thin film magnetic head, and said second magnetic layer is formed on said inclination portion of said insulating film.

3. The fabricating method as defined in claim 1, further comprising the step of removing said antireflection film and said photoresist after forming said second magnetic layer.

4. The fabricating method as defined in claim 3, wherein said antireflection film is removed by means of developing.

5. The fabricating method as defined in claim 3, wherein said antireflection film is removed by means of ashing.

6. The fabricating method as defined in claim 3, wherein said antireflection film is removed by means of RF ashing.

7. The fabricating method as defined in claim 1, further comprising the step of exposing said antireflection film after forming said antireflection film and before applying said photoresist.

8. The fabricating method as defined in claim 1, wherein said photoresist and said antireflection film are exposed by a laser beam with a wavelength of 160–400 nm.

9. The fabricating method as defined in claim 1, wherein said photoresist is made of chemical sensitive photoresist.

10. The fabricating method as defined in claim 1, wherein a forefront width of said inner pattern along a track width direction is narrowed to 300 nm or below.

11. The fabricating method as defined in claim 1, further comprising the step of forming a magnetoresistive effective element.

* * * * *